INVENTOR
ALBERT AXELROD
BY Theodore Hogue
ATTORNEY.

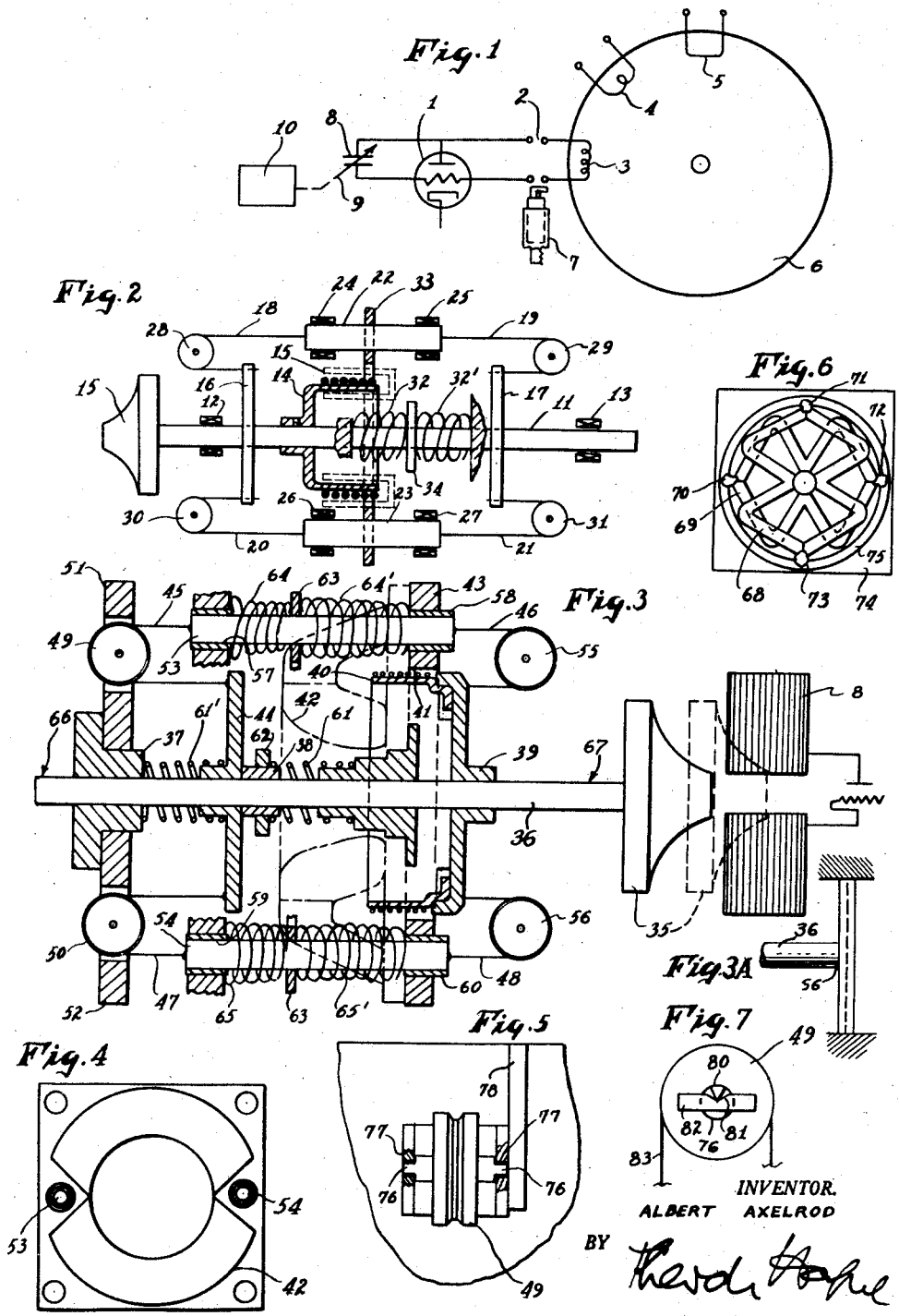

INVENTOR
ALBERT AXELROD
BY
ATTORNEY.

United States Patent Office 2,896,139
Patented July 21, 1959

2,896,139

ELECTROMECHANICAL TRANSDUCER FOR CONTROLLING A TUNING CONDENSER IN AN OSCILLATOR CIRCUIT

Albert Axelrod, Bronx, N.Y., assignor, by mesne assignments, to Van Norman Industries, Inc., New York, N.Y.

Application August 10, 1956, Serial No. 603,291

15 Claims. (Cl. 317—250)

This invention is a continuation in part of the patent application entitled, "Improvements in or Relating to Electro Mechanical Transducers," filed on March 8, 1955, U.S. Serial No. 493,005, now Patent No. 2,761,981.

This invention relates to energy transducers, especially of the electromechanical type and for application to control the frequency of a frequency modulation high frequency generator or like electronic instruments.

One of the objects of the invention is an electro-mechanical transducer, which is substantially insensitive to or independent from movements or vibrations such as occurring in the operation of an aircraft.

A more specific object of the invention is to compensate any torque exerted upon the transducer by a counter torque.

Another object of the invention is an electromechanical transducer especially designed and adapted for the control or testing of airborne equipment such as radar apparatus, which is substantially independent from changes in position, speed or acceleration of the aircraft carried equipment.

Still another object of the invention is an electromechanical transducer in which the weight or mass of the moving or vibrating elements is counterbalanced by one or more compensating weights or masses.

A further object of the invention is a driving mechanism for a frequency controlling element, for example the tuning circuit of a high frequency oscillator, in which the member driving the frequency controlling element is coupled to at least two weights or masses symmetrically arranged in such a way that any movement of the driving member in one or the other direction is automatically compensated by a symmetrical movement of the balancing weights or masses occurring in a direction opposite with respect to the driving direction.

A further specific object of the invention is to provide a longitudinal driving member or shaft of an electrodynamic type transducer at opposite ends thereof, with radially extending coupling wires connecting these ends to diametrically arranged pairs of balancing weights or masses so that any sliding movement of the shaft in one axial direction is accompanied, or caused to be accompanied, by opposite sliding movements of symmetrically arranged balancing weights or masses.

These and other objects of the invention will be more fully apparent from the drawings enclosed herewith, in which Figure 1 shows in a more or less diagrammatical manner the operation of an electromechanical driving mechanism arranged to modulate a 400 mc. oscillator within relatively large predetermined limits of say, ±20% in accordance with this invention.

Figure 2 shows in greater detail an electromechanic transducer and especially a driving mechanism embodying certain features of the invention.

Figures 3, 4, and 5, inside front and rear elevation respectively show, somewhat modified, a specific example of such a driving mechanism in detail, and as applied to operate the movable portion of a tuning condenser. Figure 3A shows a modification of Figure 3 and Figure 6 shows a modification of Figure 5.

Figure 7 shows a modification of the structure shown in Figure 5.

Figure 8:
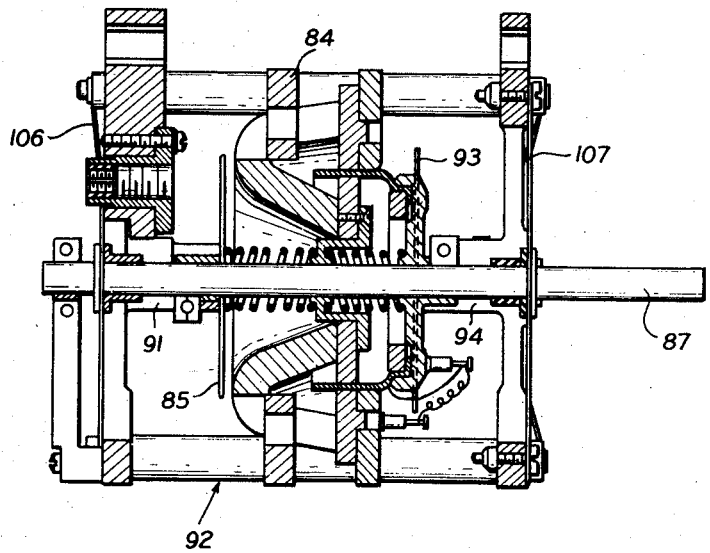
Figures 8, 9, 10 and 11 show different views of a modification of the embodiment shown in Figure 3, Figures 9, 10, and 11 representing top, side, and rear views and with Figure 8 representing a cross section of Fig. 10 along lines A, A, respectively.

In Figure 1 a high frequency oscillator tube is shown at 1 having a tuning circuit 2, which may be connected selectively to a number of inductance coils such as schematically indicated at 3, 4, 5 mounted on a rotatable disc 6 in otherwise well known manner, so as to permit the tune oscillator 1 to various predetermined frequencies of frequency ranges extending, for example, over a total range of say, 25 mc. to 400 mc.

The frequency of oscillator 1 is varied or modulated by an adjustable condenser schematically indicated at 8. Condenser 8 is mechanically coupled as indicated by dotted line 9 with an electromechanical transducer 10, which provides the necessary changes in the position of the moving element of condenser 8, to effect the necessary modulation of the frequency of oscillator 1.

In this way condenser 8 is continuously adjusted mechanically on guide rails, and reciprocated about any predetermined position under control of electromagnetic transducer 10, and in accordance with the invention a frequency modulation up to approximately 20% and more can be achieved as compared to a frequency modulation achieved with other devices, especially of the electronic type, not extending over a modulation of ±5%.

Such extensive modulation is realized in accordance with the invention by a torque-balanced or compensated electromechanical transducer, an example of which is shown in a more or less diagrammatical fashion in Figure 2.

In the embodiment of Figure 2 an electromechanical transducer of the electro-dynamic type is shown to consist of a shaft 11, slidingly supported on bearings 12, 13 and driven by a coil structure 14 supported on shaft 11 at a point intermediate bearings 12, 13.

Coil structure 14 is arranged to be mounted in otherwise well known manner in the annular gap of an electromagnetic system of the permanent or energized type such as is well known, for example, from the construction of electrodynamic loud speakers or microphones.

Application of current to coil structure 14 of a predetermined frequency such as 25 cycles per second will cause coil structure 14 and shaft 11 to oscillate at the desired frequency and in longitudinal direction.

By coupling shaft 11 at one end thereof, with the movable part of a condenser such as schematically indicated at 15 and connected to cause a capacity variation by cooperating with a corresponding stationary part (not shown), the movement of condenser part 15 and its driving member, shaft 11, can be used to control the frequency of a tuning circuit of an oscillator such as shown in Figure 1 at 1.

In this way rather large variations in frequency and consequently large degrees of modulation can be obtained in accordance with the invention and in a rather simple and relatively inexpensive manner.

In the experiments underlying the invention, it has been found that such an electromechanical transducer, especially in airborne equipment, is insensitive to changes in position, speed and acceleration of the aircraft carried equipment.

In accordance with the invention any such deviations which would cause an undesired movement of, or torque exerted upon, the driving element of the electromechanical transducer in one direction is compensated by a corresponding movement of, or torque exerted upon, the balancing weights or masses arranged symmetrically with respect to the driving shaft, in an opposite direction.

In the particular embodiment of the invention shown in Figure 2 shaft 11 is provided at a predetermined distance between bearings 12, 13 with two supporting yokes, or any other radial members mounted thereon as schematically indicated in Figure 2 at 16, 17.

These supporting members 16, 17 are attached or coupled to each other by strings or steel wires or ribbons shown at 18, 19 and 20, 21 respectively which in turn actuate balancing weights schematically indicated at 22, 23 respectively and arranged to move slidably in bearings 24, 25 and 26, 27 respectively.

Thus, for example, on the assumption that the entire weight of the movable members supported on shaft 11 (and including shaft 11 itself) is half a pound, each of balancing weights 22, 23 respectively will be designed to have the weight of .25 pound each.

The connection of ribbons 18, 19 and 20, 21 with each other and with yokes 16, 17 is caused to occur over rollers 28, 29 and 30, 31 respectively. These rollers arranged stationary in the instrument, are supported to rotate with as little friction as possible, preferably between steel points or on any other type of friction-free bearings.

Thus any torque applied as a result of change in position, speed and acceleration, or any other mechanical deviation, to shaft 11 and condenser element 15, will be automatically compensated and counteracted by a corresponding torque exerted on balancing weights or masses 22, 23.

The invention is of course not limited to the arrangement of the balancing mechanism shown in Figure 2.

The balancing masses may be attached to each other by a ring member 33 to insure rigidity of the moving structures.

Instead of two balancing weights or masses, three or more may be arranged if necessary and instead of driving the condenser element directly from the shaft of the transducer, intermediate couplings may be provided, all this without departing from the scope of this disclosure. Nor is the invention limited to the movement of an electrodynamic mechanism. Any other type of control mechanism may be designed in accordance with the invention and may be provided with any type of driving mechanism such as electrostatic or electromagnetic or mechanical types also without departing from the framework of this invention.

In order to facilitate balancing of the electromechanical transducer a pair of springs are arranged on shaft 11 such as shown at 32, 32' adjustable by a positioning disc 34 movable and fixable along shaft 11 in one direction or another.

In Figures 3, 4, and 5 an electromechanical transducer of the electrodynamic type is shown such as used to drive an electrodynamic loud speaker. In this case the movable part of a tuning condenser is indicated at 35, and the stationary part at 8.

In accordance with the invention, modulation of the oscillator frequency is effected by moving the movable part 35 to and fro from the position shown in full into the position shown in dotted line and back.

Condenser part 35 is coupled to shaft 36 at one end thereof. Shaft 36 is supported on bearings 37, 38 which are in turn supported in the instrument in a manner not shown but believed to be irrelevant for the purpose of this invention.

Further supported on shaft 36, is a disc 39 supporting an electrodynamic coil 40 movable in gap 41 of an electromagnetic system schematically indicated in Fig. 3 at 42 and supported on the instrument chassis, part of which is shown at 43.

Coil 40, as already stated before, is energized with any desired frequency to produce the desired vibration or oscillation of condenser part 35, in accordance with the invention.

Magnetic system 42 can be of the permanent or current fed type and can be arranged coaxial and symmetrical with coil 40, or in any other manner without exceeding the scope of this invention.

In addition to disc 39 supporting coil 40 in gap 41, there is arranged on shaft 36, another and similar disc member 44.

Between disc member 39 and 44 there are attached to peripheral portions thereof, two pairs of steel wires or preferably ribbons 45, 46, and 47, 48 respectively, arranged diametrically with respect to each other and symmetrically with respect to shaft 36.

Steel ribbons 45 through 48 are preferably pre-tensioned to enhance their temperature and shock insensitivity.

Ribbons 45, 47 extend from disc 44 over rollers 49, 50 to be attached to one end of balancing masses 53, 54.

Rollers 49, 50 are supported as shown schematically on parts or brackets 51, 52 of the instrument chassis, or in any other manner. Rollers 49, 50 are preferably arranged between watch type point shaped bearings schematically indicated in Figure 5 to reduce friction to a minimum.

Ribbons 46, 48 extend from disc member 39 over rollers 55, 56 to be attached to the opposite ends of balancing weights or masses 53, 54.

Rollers 55, 56 are arranged and supported in a manner similar to that shown for rollers 49, 50.

Balancing weights or masses 53, 54 are supported to slide in bearings indicated at 57, 58 and 59, 60 respectively, which are mounted stationary in the instrument chassis in a manner not shown and not believed to be relevant for the invention.

Instead of ribbons—or wires or the like—45 to 48 forming separate pieces, wire portions 45, 46 and 47, 48 can be made of single pieces extending through an opening in balancing weights 53, 54 and attached through these openings to balancing weights 53, 54.

Under these circumstances, in accordance with the invention through ribbon coupling 45 to 48, any movement of shaft 36 in one direction will be opposed by a corresponding torque of equal size in an opposite direction.

In this manner the electromechanic transducer becomes operative substantially independent from its position in space and also independent from changes in speed, acceleration and any other deviations in operating conditions.

As indicated in Figure 3 adjustment springs of the coil type schematically indicated at 61, 61' can be arranged between stop member 62 supported on shaft 36 preferably in an adjustable position, and bearings 37 and 38 respectively.

Ring member 63 attached to balancing weight or masses 53, 54 serves to supply a considerable portion if not the entire amount of the balancing weight required in accordance with the invention, and thereby reduce the diameter of balancing weight or masses 53, 54. The entire structure should be mounted as rigidly as possible.

Springs 64—64' and 65—65' serve to filter vibrations or to prevent them from reaching the moving structure.

In accordance with a further feature of the invention coil springs 61, 61' can be dispensed with and replaced if necessary by leaf or disc spring structures schematically indicated in Fig. 3A as attached to shaft 36 at one end thereof at point 66 and near the other end of shaft 36, at point 67.

Experiments underlying the invention have shown that the leaf spring must be adapted to move equally, or be equally flexible, in a number of radial directions symmetrically with respect to the longitudinal axis of movement of shaft 36.

In accordance with the invention, a leaf or disc spring has been designed in the form apparent from Figure 6 of a "double W" or "double M" configuration. In order to equalize flexibility over all angular directions with respect to shaft 36 two such double W springs 68, 69 are provided for each of points 66, 67 respectively, and at each of these points are attached to each other axially, and displaced with respect to each other by an angle of 90 degrees, preferably attached at points 70, 71, 72 and 73 to a stationary supporting plate 74 having an opening 75 along which attachment points 70—73 are situated.

The invention is not limited to the mounting of balancing weights shown and described.

If necessary more balancing members can be provided, preferably in a symmetrical arrangement with respect to shaft 36. In this case the entire movable weight or mass of the transducer should be divided over such greater number of balancing weights or masses, in accordance with this invention.

In Figure 5, wheel 49 is shown mounted with shaft pins 76 in jewel bearings 77 provided on bracket 78.

Alternatively as apparent from Figure 7, which shows a modification of the structure shown in Figure 5, in a corresponding side view, wheel 49 has a shaft 76 extending at both ends thereof into wedge shaped end portions one of which is shown in Figure 7 at 80. Wedges 80 are supported on triangularly shaped grooves one of which is shown at 81 machined in supporting blocks. One of these blocks is shown at 82 supported on a bracket of the type and mounting illustrated in Figure 5 at 78.

Thus, the rocking movement imparted to rollers 49 by ribbon 83 (Figure 7) will be accompanied by a minimum amount of friction.

Figure 9:
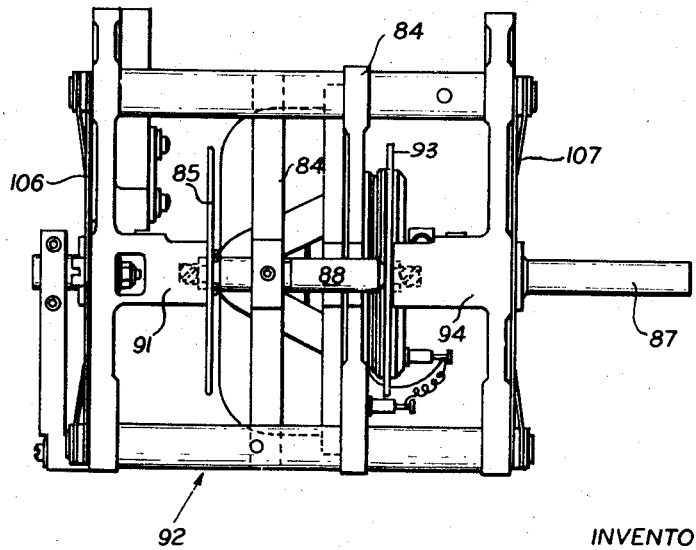
Figure 10:
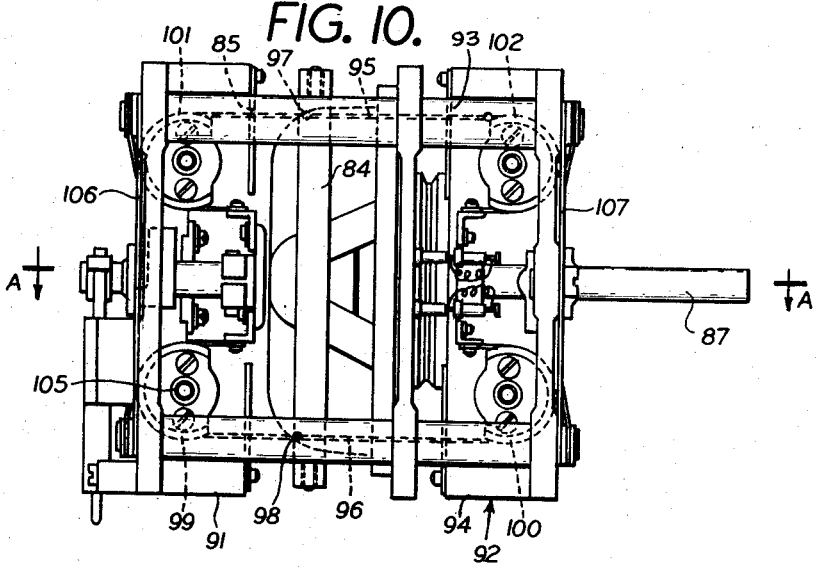

In the embodiment of Figures 8 through 11 the two lateral balancing weights shown in Figure 2 at 22 and 23 and in Figure 3 at 53, 54 are replaced by a single annular balancing weight or mass schematically indicated in Figure 8 as well as Figures 9 and 10 at 84.

Figure 11:
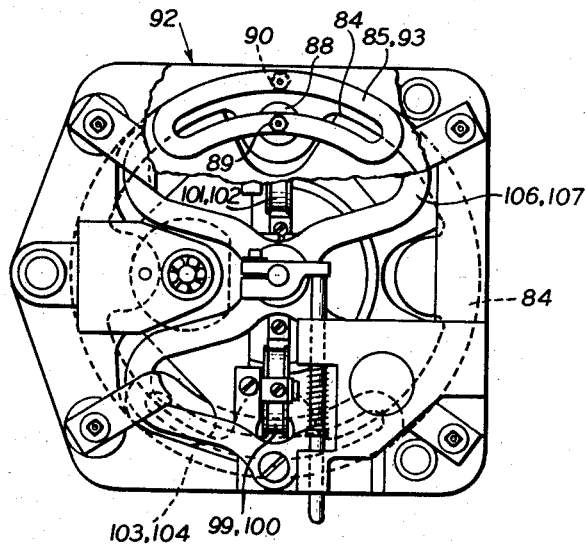

The single balancing mass 84 instead of being frictionally supported in bearings of the type shown in Figure 2 at 24, 25 and in 26 and 27 and in Figure 3 at 57, 58, 59 and 60 is supported on leaf springs of the type shown in Figure 11 at 85 in the following manner:

Annular balancing mass 84 is provided at diametrical points thereof with shafts perpendicularly extending therethrough and therefrom in a direction parallel to that of the main or load shaft of the transducer schematically indicated in Figures 8 to 10 at 87. One of these supporting shafts for said balancing mass 84 is shown in Figures 9 and 11 at 88 and its ends at opposite sides of the annular balancing mass 84 are attached to the movable or inner portion of leaf spring 85 by means of a screw schematically indicated in Figure 11 at 89. The other or fixed portion of leaf spring 85 is attached by means of a screw schematically indicated at 90 fixedly to a projection 91 of the framework 92 of the transducer as schematically shown in Figure 9.

Figure 9 also shows the attachment of the other end of shaft 88 over a leaf spring similar to that shown at 85 and schematically indicated at 93 and having a fixed portion attached to projection 94 of the frame structure 92 of the transducer.

In this way free movement of annular mass 84 is assured in a direction substantially parallel to that of the load shaft 87 yet with a minimum of friction.

In accordance with the invention the axial movement of balancing arrangement 84 is assured by connecting or coupling two diametrical points preferably arranged in quadrature with respect to the supporting shaft 88 to pretensioned wires 95, 96 at points 97, 98 of annular ring member 84. Wires 95, 96 extend in a manner similar to that shown in Figures 2 and 3 over pulleys 99, 100, 101, and 102 to radial holding members 103, 104 attached to and vibrating with load shaft 87. See Figure 10.

In this way every axial or longitudinal movement of load shaft 87 is accompanied and balanced by a parallel but oppositely directed movement of annular member or mass 84.

In the embodiment of Figures 8 through 11 pulleys 99 through 102 in contrast to pulleys 28 through 31 of Figure 2 or 49, 50 and 55 and 56 of Figure 3 are not supported on wedges as shown in Figure 7 but on ball bearings such as indicated in Figure 10 at 105.

Furthermore in accordance with the invention and similar to the manner of attachment shown in the previous figures the ends of shaft 87 are not supported on ball bearings but on double W-shaped type springs schematically shown in Figures 8, 9, 10 and 11 at 106, 107.

Furthermore in accordance with the invention the springs 106 and 107 have exactly the same shape except that they are radially displaced with respect to each other by an angle of 90 degrees to provide a radial stiffness to provide a correspondingly displaced maximum radial stiffness at the same time providing maximum amount of flexibility and substantially the same amount of flexibility in axial direction or the direction of vibration of load shaft 87 supported thereon.

The resonance frequency of the annular mass should be relatively low or preferably substantially at the lower end of the audible range. In the particular instance a resonance frequency of 24 cycles per second is provided by a proper adjustment of mass and elasticity factors involved in the suspension of mass 84.

The invention is not limited, however, to the exact shape of the leaf springs shown and described, whether these leaf springs are of the double W-type, such as shown at 106 and 107 or of the kidney shape type shown at 85.

Furthermore the balancing mass may have any desired form or shape also without departing from the scope of this disclosure.

I claim:

1. In a transportable electro-mechanical transducer for producing a sweep frequency in an electric oscillator circuit, a load member including a shaft and condenser electrode means attached to said shaft, driving means under control of electromagnetic alternating current energy to cause said load member to vibrate in the longitudinal direction of said shaft, there being arranged stationary with respect to said shaft other condenser electrode means cooperating with said first condenser electrode means, counterbalancing means arranged substantially symmetrically with respect to said load member and coupled at least to two diametrical points of said load member so as to move under control of said driving means in a direction which at any moment is substantially opposite to that of the momentary direction of said load member, thereby counteracting the external forces due to the transport movement exerted upon said load member.

2. Transducer according to claim 1, wherein said load member includes a pair of radial members supported on said shaft at a predetermined distance from each other; said balancing means including slidable masses interconnecting corresponding peripheral portions of said radial members, and wherein corresponding peripheral portions of said radial members are connected to each other by means of ribbons and rollers supporting said ribbons; said ribbons being attached to slidable masses, designed to counterbalance the movable mass of said driving means.

3. Transducer according to claim 2, wherein said corresponding peripheral portions of said radial members are connected to each other by means of strings said strings are pretensioned.

4. Transducer according to claim 1, comprising coil springs adjustably controlling the movement of said load member in opposite direction and arranged at points intermediate to the end of said shaft.

5. Transducer according to claim 1, comprising disc spring means supporting said shaft at least at one point thereof and controlling the movement of said driving means in opposite directions.

6. Transducer according to claim 2, comprising rollers supporting said ribbons and supported on point shaped bearings.

7. Transducer according to claim 1, wherein said driving means include an electrodynamic driving system arranged substantially symmetrically with respect to said shaft to drive said shaft substantially in a longitudinal direction, and said counterbalancing means include a pair of radial supporting elements arranged on said shaft at a predetermined distance from each other and circumferentially interconnected by ribbons supporting weights balancing the weight on said shaft, one of said supporting elements also supporting a driving coil.

8. Transducer according to claim 5, wherein said disc shaped spring consists of two disc springs of double W shape, one displaced by 90 degrees with respect to the other, and both attached to each other and to said shaft coaxially therewith.

9. Transducer according to claim 7, wherein said two radial supporting members are of disc shape, one having peripherally attached thereto an electrodynamic driving coil, there being provided an electromagnetic system having an annular gap cooperating with said driving coil and arranged symmetrically with respect to said shaft.

10. Transducer according to claim 1, wherein; said counterbalancing means include an annular mass connected to corresponding peripheral portions of said radial members.

11. Transducer according to claim 10, wherein corresponding peripheral portions of said radial members are connected to each other by means of wires and pulleys supporting said wires; said wires being pretensioned and attached to said annular mass designed to counterbalance the movable mass of said load member.

12. Transducer according to claim 1, comprising coil springs adjustably controlling the resonant frequency of said load member and arranged at points intermediate to the ends of said load member.

13. Transducer according to claim 1, comprising disc spring means arranged at the end of said load member and controlling the movement of said load member in opposite directions.

14. Transducer according to claim 6, wherein said annular mass has affixed thereto at least two diametrical points thereof and a pair of shafts extending through said mass in a direction substantially parallel to said load member, and supported on opposite ends thereof on pairs of leaf springs extending on a plane substantially perpendicular.

15. Transducer according to claim 14, wherein said leaf springs consist of a pair of spaced concentric flat spring sections approximately of kidney shape; with the ends of such spring sections being integrally interconnected; the outer one of said ring sections being fixedly attached at its center while the inner one of such spring sections is movably attached at its center to the shaft end.

References Cited in the file of this patent

UNITED STATES PATENTS

| | | |
|---|---|---|
| 2,469,289 | Beard et al. | May 3, 1949 |
| 2,545,623 | MacKenzie | Mar. 20, 1951 |